United States Patent
Yanez Lucero et al.

(10) Patent No.: US 11,789,944 B2
(45) Date of Patent: Oct. 17, 2023

(54) USER-SPECIFIC COMPUTER INTERACTION RECALL

(71) Applicant: Microsoft Technology Licensing, LLC, Redmond, WA (US)

(72) Inventors: Fernando Javier Yanez Lucero, Vancouver (CA); Mastafa Hamza Foufa, Nimes (FR); Romain Gabriel Paul Rey, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 17/228,606

(22) Filed: Apr. 12, 2021

(65) Prior Publication Data
US 2022/0327120 A1    Oct. 13, 2022

(51) Int. Cl.
*G06F 16/2452* (2019.01)
*G06F 16/2453* (2019.01)

(52) U.S. Cl.
CPC .... *G06F 16/2452* (2019.01); *G06F 16/24542* (2019.01)

(58) Field of Classification Search
CPC ........... G06F 16/2452; G06F 16/24542; G06F 16/35; G06F 16/483
See application file for complete search history.

(56) References Cited

U.S. PATENT DOCUMENTS

| | | |
|---|---|---|
| 5,943,669 A | 8/1999 | Numata |
| 9,400,779 B2 | 7/2016 | Convertino et al. |
| 10,078,627 B2 | 9/2018 | Desai et al. |
| 10,915,570 B2 | 2/2021 | Ramamurthy et al. |
| 2007/0112792 A1 | 5/2007 | Majumder et al. |
| 2018/0300609 A1* | 10/2018 | Krishnamurthy ...... G06N 3/088 |
| 2019/0235732 A1* | 8/2019 | Chandra ............... G06F 40/169 |
| 2020/0045354 A1 | 2/2020 | Gao et al. |

(Continued)

OTHER PUBLICATIONS

"International Search Report and Written Opinion Issued in PCT Application No. PCT/US22/021232", dated Jul. 1, 2022, 12 Pages.

(Continued)

*Primary Examiner* — Albert M Phillips, III
(74) *Attorney, Agent, or Firm* — Alleman Hall Creasman & Tuttle LLP

(57) ABSTRACT

A computer-implemented method for recalling user-specific interactions is disclosed. User-specific application data for each of a plurality of different computer application programs is received at a computing system. The user-specific application data is translated into different content vectors representing different user-specific interactions between a user and one or more other users while using the plurality of different computer application programs. Each content vector includes parameters quantifying interaction attributes of the corresponding user-specific interaction. The content vectors are mapped to a high-dimensional content space. A query is received at the computing system and translated into a query vector. Geometric mathematical operations are performed to compare content vectors in the high-dimensional content space to the query vector to identify a content vector that correlates to the query vector. A response to the query that identifies a user-specific interaction corresponding to the identified content vector is output from the computing system.

17 Claims, 7 Drawing Sheets

(56) References Cited

U.S. PATENT DOCUMENTS

2020/0226475 A1\* 7/2020 Ma .......................... G06N 3/088
2021/0021558 A1 1/2021 Mahmoud et al.

OTHER PUBLICATIONS

"Automated Meeting Notes for In-Person and Remote Conversations", Retrieved from: https://web.archive.org/web/20201130131747/https:/deeptalk-ai.com/, Nov. 30, 2020, 10 Pages.

Elvir, et al., "Remembering a Conversation—A Conversational Memory Architecture for Embodied Conversational Agents", In Journal of Intelligent Systems, vol. 26, Issue 1, Jan. 1, 2017, pp. 1-21.

Keshamoni, "Hyderabad based Fireflies.ai, founded by MIT & Microsoft alumni, raises $5m to put a voice assistant in every meeting", Retrieved From: https://web.archive.org/web/20201128112552/http:/startuphyderabad.com/fireflies-ai-founded-by-mit-microsoft-alumni-raises-5m-to-put-a-voice-assistant-in-every-meeting/, Nov. 28, 2020, 7 Pages.

\* cited by examiner

USER-SPECIFIC COMPUTER INTERACTION RECALL

BACKGROUND

Due to advances in computer technology, human interactions that once existed only in-person now can be conducted using computers. For example, meetings, educational classes, conversations, and chats all may be conducted using computers. Further, users may interact with each other using a variety of different computer application programs, such as audio/video conferencing, email, instant messaging, and document sharing and collaboration. Such computer-based interactions may produce a wealth of information, such as comments, proposals, and decisions among other forms of information. The volume of information generated during such computer-based interactions may be too large for a typical person to remember every detail of every interaction.

SUMMARY

A computer-implemented method for recalling user-specific interactions is disclosed. User-specific application data for each of a plurality of different computer application programs is received at a computing system. The user-specific application data is translated into different content vectors representing different user-specific interactions between a user and one or more other users while using the plurality of different computer application programs. Each content vector includes parameters quantifying interaction attributes of the corresponding user-specific interaction. The content vectors are mapped to a high-dimensional content space. A query is received at the computing system and translated into a query vector. Geometric mathematical operations are performed to compare content vectors in the high-dimensional content space to the query vector to identify a content vector that correlates to the query vector. A response to the query that identifies a user-specific interaction corresponding to the identified content vector is output from the computing system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
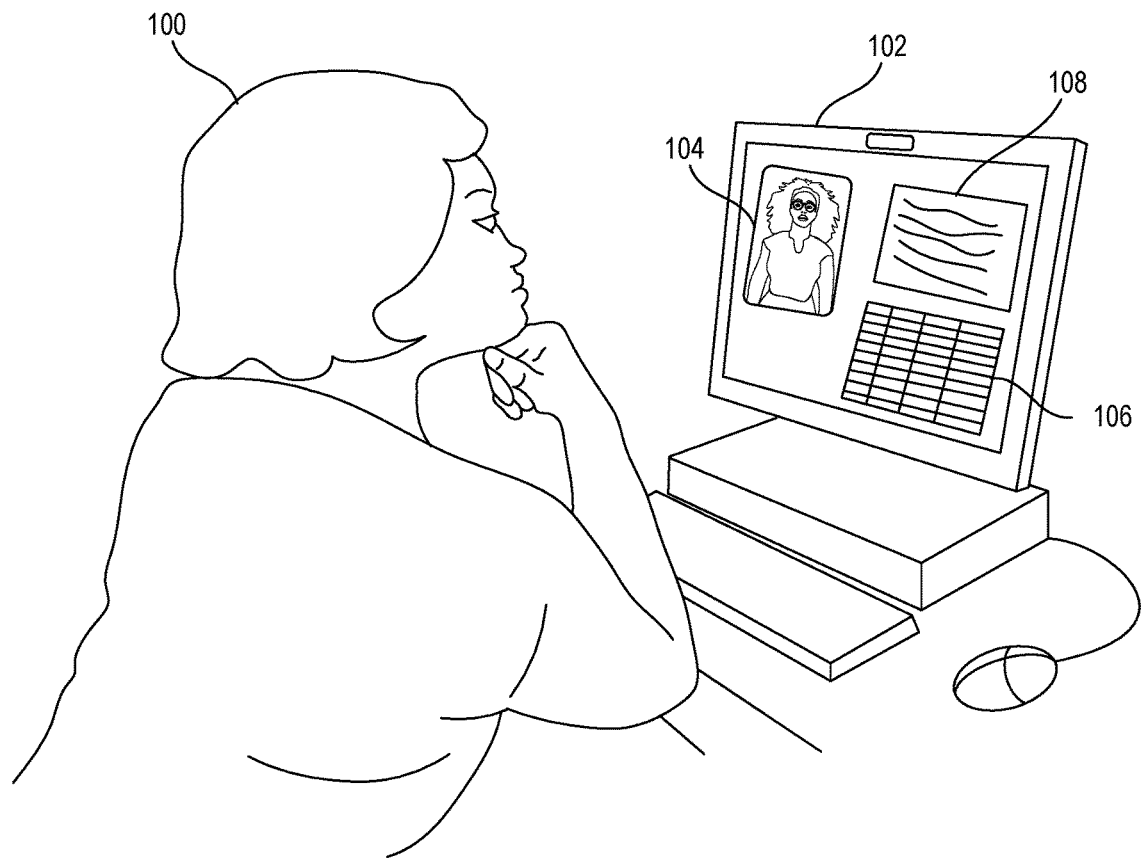
FIG. 1 shows an example scenario where a user is interacting with other users while using a plurality of different computer application programs executed by a computer.

Computer-based interactions between a user and other users while using different computer application programs may produce a wealth of information. The volume of information generated during such computer-based interactions may be too large for a typical person to remember every detail of every interaction.

Accordingly, the present description is directed to a computer-implemented approach for recalling user-specific interactions between a user and other users while using different computer application programs. Such an approach may include tracking and storing user-specific application data for most, if not all, user-specific interaction. For example, messages written and comments spoken from or to the user while using different computer application programs may be tracked and stored.

Such an approach may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected with the utmost respect for user privacy (e.g., user data may be collected only when the user owning the data provides affirmative consent, and/or the user owning the data may be notified whenever the user data is collected). If data is to be collected, it can and should be collected with the utmost respect for user privacy. If the data is to be released for access by anyone other than the user or used for any decision-making process, the user's consent will be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

Such a computer-implemented approach may be embodied be a "virtual conscience" model that is trained using Natural Language Processing (NLP) techniques to extract knowledge, topics, context, and other classifying characteristics from the tracked user-specific interactions. The virtual conscience model may be configured to characterize a plurality of different user-specific interactions across a plurality of different computer application programs using content vectors. Each different parameter of a content vector may be used to quantify a different interaction attribute of the corresponding user-specific interaction. The virtual conscience model may be configured to map such content vectors in a high-dimensional content space that allows for simple geometric mathematical operations to be performed to determine different levels of correlation. Such an approach allows for a user to interact with the virtual conscience model to ask for specific words, phrases, subjects, users, topics, and/or other primitive and/or derived parameters in order to find the moments when corresponding interactions occurred while using any of a plurality of different application programs.

Such a computer-implemented approach for recalling user-specific interactions is personalized for every user. For example, when two different users query the virtual conscience model with the same query, the virtual conscience model will return different results that are specific to the user interactions of the different users.

FIG. 1 shows an example scenario where a user 100 is interacting with other users while using a plurality of different computer application programs executed by a user computer 102. For example, a first user 100 is having a conversation with a second user via a video conferencing application program 104. At the same time, both the first and second users are collaborating on a shared spreadsheet of a spreadsheet application program 106. Further still, the first user 100 is using an email application program 108 to send an email to a third user as part of a different interaction that is specific to the first user 100 but that does not involve the second user.

The user computer 102 and/or cooperating network computers of a computing system 200 (shown in FIG. 2) may be configured to track and store user-specific application data for each different computer application program. User-specific application data associated with a computer application program may be generated based on a user-specific interaction between the user 100 and one or more other users while using the particular computer application program.

For example, a transcription feature of the video conferencing application program 104 may be configured to recognize and record the conversation between the user 100 and the other user as text. The transcription feature may be able to attribute different text snippets from the conversation to the different users, so that every word that is spoken during the conversation is tracked and stored as application data for the video conference application program 104. This application data may be tagged with keyword tags that associate the application data of the video conferencing application program 104 with this particular user-specific interaction of the user 100. Further, a video recording of the conversation itself may be tracked, stored, and tagged in the same manner.

Further, the user computer 102 and/or cooperating network computers of the computing system 200 (shown in FIG. 2) may be configured to track and store different collaborative actions performed on the shared spreadsheet by the first user 100 and the second user. For example, different cell entries, annotations, and comments entered into the shared spreadsheet by the different users may be tracked and stored. Further, this application data may be tagged with keyword tags that associate the application data with this particular interaction between the first user 100 and the second user. Further, the shared spreadsheet itself may be tracked, stored, and tagged in the same manner.

Further still, the user computer 102 and/or cooperating network computers of a computing system 200 may be configured to track and store email messages sent between the first user 100 and the third user while using the email application program 108 as part of a different user-specific interaction of the first user 100. This application data may be tagged with keyword tags that associate the application data with this particular interaction between the first user 100 and the third user. Further, the email messages themselves may be tracked, stored, and tagged in the same manner.

Figure 2:
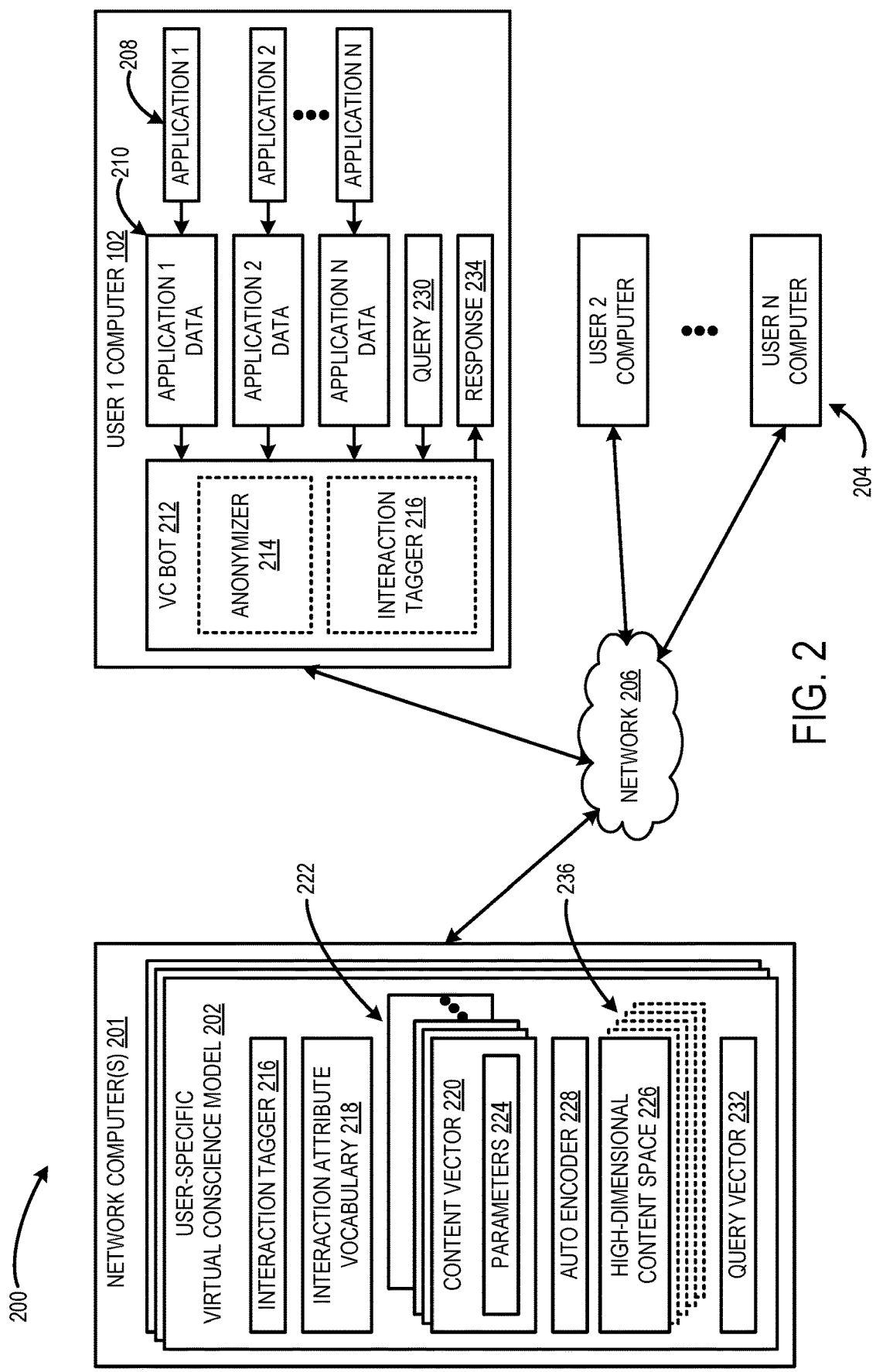
FIG. 2 shows an example computing system that is configured to recall user-specific interactions between a user and various other users while using a plurality of different computer application programs.

FIG. 2 shows an example computing system 200 that is configured to recall user-specific interactions between a user and various other users while using a plurality of different computer application programs. In particular, the computing system 200 is configured to execute a user-specific virtual conscience model 202 that is configured to provide personalized recall functionality to a user based on the user-specific interactions of the user. The computing system 200 may be configured to execute a different instance of the user-specific virtual conscience model 202 for each of a plurality of different users. Each instance of the user-specific virtual conscience model 202 may evolve differently over time based on the different user-specific interactions of the different users. The plurality of users may be associated with a plurality of different user computers 204 including the user computer 102 associated with the first user 100 (shown in FIG. 1). The computing system 200 may further include one or more network computers 201. The network computer(s) 201 may be communicatively coupled to the plurality of different user computers 204 via a computer network 206. The computing system 200 includes the network computer(s) 201 and the user computers 204.

The user computer 102 is shown in greater detail than the other user computers of the plurality of user computers 204, but the other user computers may be configured in the same or similar manner with respect to the interaction recall abilities. In some examples, multiple user computers may be associated with the same user and user-specific interactions may be tracked across all user computers associated with a particular user.

The user computer 102 and/or the network computer(s) 201 of the computing system 200 are configured to execute a plurality of computer application programs 208. Each computer application program is configured to generate user-specific application data 210 based on user-specific interactions between the first user and one or more other users while using the computer application program. The user-specific application data 210 may include any suitable type of content object involved in a user-specific interaction. For example, a content object may include, but is not limited to, a video conference recording, a voice recording, an email message, an instant message, a word-processing file, a slide-presentation file, a spreadsheet file, a video, and an image. Additionally, user-specific application data 210 may include any suitable communication or other information that represents a user-specific interaction of the first user. For example, such user-specific application data may include a text transcript for a video conference or a phone conversation. As another example, such user-specific application data 210 may include comments, annotations, notes, edits, or other data included in a content object, such as a shared word-processing file or a spreadsheet file. As yet another example, hearing impaired users may have a conversation using sign language that is captured in a video and a sign-language translator computer application program may be applied to the video to produce a text transcript of the conversation. Any suitable computer application program may be configured to generate any suitable type of user-specific application data based on user-specific interactions between the first user and one or more other users while using the computer application program.

The user computer 102 may be configured to execute a client representation of the user-specific virtual conscience model 202 in the form of an automated question answering natural language processing computer application program 212 also referred to herein as a virtual conscience "chat bot." The virtual conscience chat bot 212 may be configured to act as an interface between the user computer 102 and the user-specific virtual conscience model 202. The virtual conscience chat bot 212 may be executed on any of the computers of the computing system 200.

In some implementations, the virtual conscience chat bot 212 may include an anonymizer 214 that is configured to anonymize the user-specific application data 210 to generate an anonymized representation of the user-specific application data that does not include personal information of the first user. In some examples personal information of a user may be pseudo-anonymized. For example, user IDs may be translated to generic IDs and specific content items may be translated to generic content items. Such anonymization performed by the anonymizer 214 allows for the user-specific application data 210 to be processed by the network computer(s) 201 of the computing system 200 without any personal information of the user being sent to or stored on the other computers of the computing system 200, while at the same time allowing all data corresponding to a particular user to be anonymously associated with that particular user. For example, the user-specific virtual conscience model 202 may be configured to process anonymized user-specific application data as a matrix of interactions between different content vectors as discussed in further detail below. A content vector may quantify any suitable type of content that is involved in a user-specific interaction including, but not limited to, a document, a theme, an action, media, etc.

The virtual conscience chat bot 212 may include an interaction tagger 216 that is configured to tag the user-specific application data 210 with contextual tags and identifier tags of users included in the user-specific interaction corresponding to the user-specific application data 210. For example, every message written, and every comment spoken from or to the user may be stored along with a user identifier tag of the user that provided message. The contextual tags may indicate contextual information about the user-interaction, such as but not limited to, a time, location, a setting (e.g., work setting, family setting), and an operating state of the computer application program and/or the user computer. In some examples, user-specific application data corresponding to user-specific interactions optionally may be filtered so only application data for those deemed a high priority are stored. In some examples, user-specific application data corresponding to user-specific interactions may be stored for a finite duration (e.g., interactions are only tracked for several months, a year, etc.). In some examples, user-specific application data corresponding to user-specific interactions that are deemed to be less important may be removed from memory or tracking may be stopped before other user-specific application data corresponding to user-specific interactions that are deemed to be more important.

Additionally or alternatively, at least some or all of the functionality of the interaction tagger 216 may be performed by the network computer(s) 201 of the computing system 200 instead of locally on the user computer 102. The computing system 200 may be configured to receive user-specific application data 210 for each of the plurality of different computer application programs 208. The interaction tagger 216 may be configured to recognize that user-specific application data corresponding to each computer application program corresponds to a separate user-specific interaction and applies appropriate tags for that user-specific interaction.

For example, the interaction tagger 216 may recognize that user-specific application data received from a word-processing application program while the word-processing application program is being used by the first user and a second user is associated with a first user-specific interaction. Further, the interaction tagger 216 may recognize that user-specific application data received from an email application program while the email application program is being used by the first user and a third user is associated with a second, different user-specific interaction. Since the interaction tagger 216 recognizes that the user-specific application data received from the different computer application programs corresponds to two different user-specific interactions, the interaction tagger 216 may tag the user-specific application data differently to reflect the different user-specific interactions.

The interaction tagger 216 may be configured to apply any suitable natural language processing techniques to the user-specific application data to extract subjects, topics, concepts, and other knowledge that may be used to tag the user-specific application data with contextual keywords. In one example, the interaction tagger 216 may apply a generalized autoregressive pretraining NLP method, such as XLNet to the user-specific application data to extract keyword tags. In some examples, the interaction tagger 216 may be configured to apply an entity recognition algorithm to the user-specific application data to recognize names, organizations, locations, medical codes, time expressions, quantities, monetary values, percentages, and other information for keyword tags.

The user-specific virtual conscience model 202 may include an interaction attribute vocabulary 218 that contains all of the keyword tags and user identifier tags that are applied to the user-specific application data 210 that corresponds to all of the different user-specific interactions processed by the user-specific virtual conscience model 202. The interaction attribute vocabulary 218 may serve as a catalogue of interaction attributes that may be used to quantify different forms of content that are involved in user-specific interactions, such as messages, comments, documents, themes, actions, media, etc.

Note that "tagging" is one example of managing and classifying the user-specific application data. The computing system 200 may be configured to classify the user-specific application data corresponding to different user-specific interactions using any suitable classification technique.

The user-specific virtual conscience model 202 may be configured to translate the user-specific application data 210 received from each different computer application program 208 into a different content vector 220 representing a different user-specific interaction. In other words, the user-specific virtual conscience model 202 may be configured to generate a plurality of different content vectors 222 corresponding to a plurality of different user-specific interactions. Such different user-specific interactions may involve different users and/or different computer application programs.

Each content vector 220 includes a plurality of parameters 224 that quantify interaction attributes of the corresponding user-specific interaction. The parameters 224 may quantify interaction attributes including one or more of key-words, key-phrases, topics, themes, concepts, a time when the corresponding user-specific interaction occurred, other users involved in the corresponding user-specific interaction, and the computer application program being used during the corresponding user-specific interaction. The parameters 224 may quantify any suitable type of interaction attribute including any of the interaction attributes included in the interaction attribute vocabulary 218. A content vector may include any suitable number of parameters. Each parameter may take the form of any suitable data type, and each content vector may utilize any suitable data structure. As one non-limiting example, a content vector may take the form of an n-dimensional array of objects, where each object is a data type suitable for its corresponding parameter.

In some examples, a content vector may correspond to a content object that is produced by a computer application program and used during a user-specific interaction. For example, such content objects may include a video conference recording, a voice recording, an email message, an instant message, a word-processing file, a slide-presentation file, a spreadsheet file, a video, and an image. A content vector may correspond to any suitable type of content object generated by a computer application program. In other examples, a content vector may not correspond to a content object and instead may be more conceptual. For example, a content vector may correspond to a theme, an event, an action, or a deadline that relates to a user-specific interaction.

The user-specific virtual conscience model 202 may be configured to map the plurality of content vectors 222 representing a plurality of different user-specific interactions to a high-dimensional content space 226 in which different parameters 224 correspond to different coordinates in the high-dimensional content space 226.

In some implementations, the user-specific virtual conscience model 202 may include an auto encoder neural network 228 that is configured to compress the plurality of content vectors 222 to produce a plurality of compressed content vectors each having compressed representations of the plurality of parameters 224. Further, the high-dimensional content space 226 may be configured to have coordinates that correspond to the compressed representations of the plurality of parameters 224 of the content vectors 222. Such compression of the content vectors 222 allows for a reduction in a number of dimensions of the high-dimensional content space 226 that allows for more efficient operation of the user-specific virtual conscience model 202 to provide user-specific interaction recall functionality. As a nonlimiting example, compressing the parameters using the auto encoder neural network 228 may cause the high-dimensional content space to go from 1000 or more different dimensions down to 300-400 dimensions. The auto encoder neural network 228 may compress the parameters of the content vectors to any suitable number of dimensions.

Figure 3:
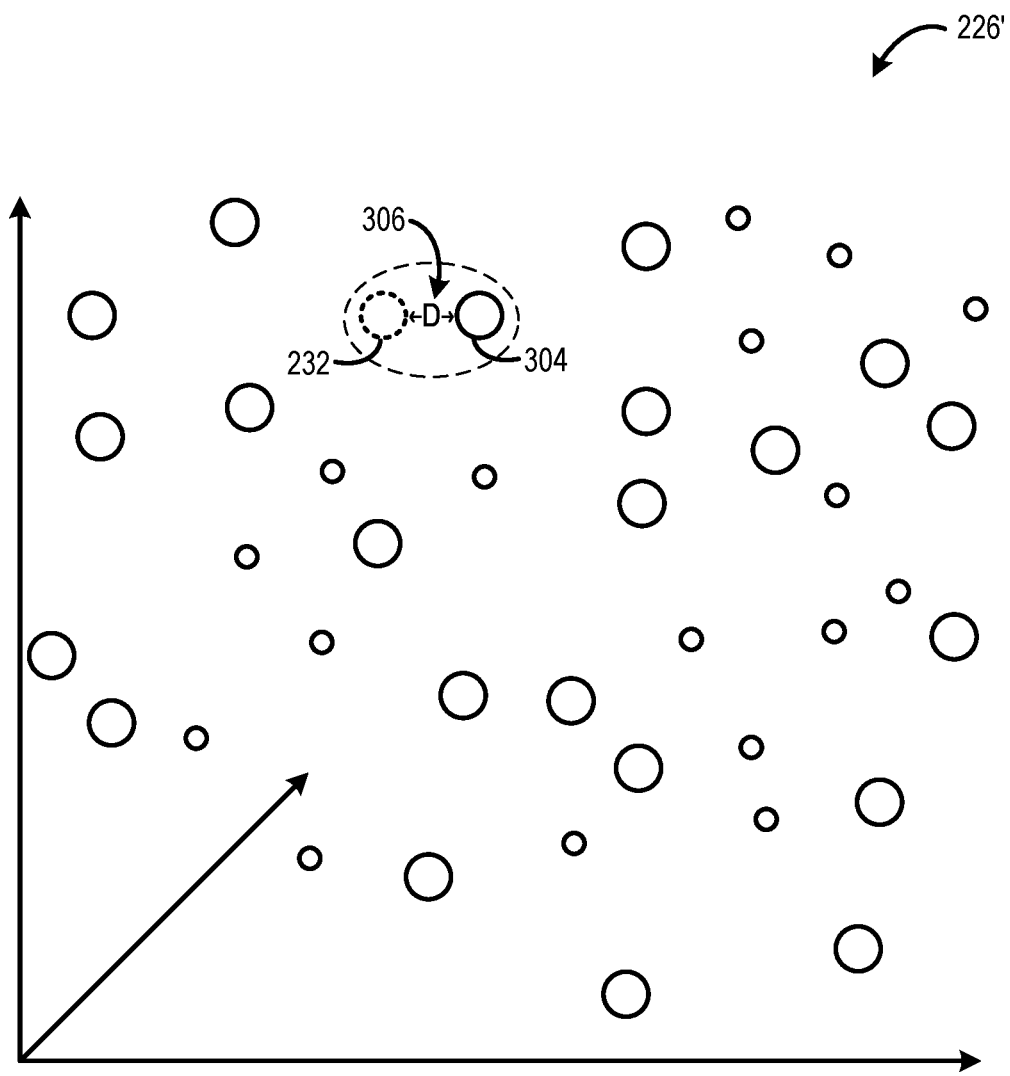
FIG. 3 shows a simplified representation of an example content space including a plurality of content vectors.

FIG. 3 shows a simplified representation of an example content space 226'. Only a three-dimensional content space 226 is illustrated for ease of visualization. The illustrated content space 226 utilizes three coordinates (corresponding to standard Cartesian coordinates), and thus each illustrated content vector (represented as a circle at the terminal end of the content vector) is quantified with respect to only three parameters. However, in practice, there is no limit to the number of parameters and thus the dimensionality of the content space. Each different content vector is spatially positioned at different coordinates within the content space 226' based on the different parameters of the content vector. Such spatial relationships of the different content vectors allow for the user-specific virtual conscience model 202 to perform geometric mathematical operations on the content vectors to determine various levels of correlation between different content vectors. For example, Euclidean distance or cosine similarity operations may be performed to determine correlations between content vectors. Further, in some examples, geometric mathematical operations may be used to identify content clusters having similar interaction attributes. Further still, in some examples arithmetic operations may be defined to identify content associated with different user-specific interactions.

The content space 226' provides a mechanism for different types of interactions corresponding to different types of content associated with different computer application programs to be cross-compared and correlated in an efficient manner. For example, the content space 226' may allow for content vectors representing videos, images, audio recordings, word-processing documents, and various other types of content to all be compared using the same metric that is based on the different parameters of the content vectors.

Returning to FIG. 2, the virtual conscience chat bot 212 may be configured to act as an interface to allow the first user to query the user-specific virtual conscience model 202 to recall information from previous user-specific interactions while using different computer application programs. The virtual conscience chat bot 212 may employ Automated Question Answering (AQA) NLP techniques to provide question and answer responses to the first user. In some examples, such NLP techniques may be based on supervised learning approaches, using datasets such as SQuAD. In other examples, such NLP techniques may be based on unsupervised learning.

The virtual conscience chat bot 212 may be configured to receive a query 230 from the first user. The query 230 may include one or more interaction attributes. For example, the first user may ask for specific words, phrases, subjects, and/or content objects (e.g., word document or video conference recording) in order to recall a user-specific interaction when that subject was discussed, and the other users involved in the user-specific interaction. The virtual conscience chat bot 212 may be configured to send the query 230 to the computing system 200.

The user-specific virtual conscience model 202 may be configured to translate the query 230 into a query vector 232 including a plurality of parameters quantifying the interaction attributes. The user-specific virtual conscience model 202 may be configured to perform one or more geometric mathematical operations to compare different content vectors in the high-dimensional content space 226 to the query vector 232 to identify a content vector that correlates to the query vector.

A content vector may be determined to correlate to the query vector 232 using any suitable correlation metric. In one example, a content vector may be determined to correlate to the query vector 232 based on a geometric distance between the two vectors in the high-dimensional content space 226 being less than a threshold. In another example, a content vector may be determined to correlate to the query vector 232 based on having a geometric distance from the query vector 232 in the high-dimensional content space 226 that is less than a geometric distance of any other content vector from the query vector 232 in the high-dimensional content space 226. In some examples, such comparisons may be made between subsets of coordinates of all available coordinates. For example, in a simplified x,y,z coordinate space, the z coordinate may be filtered out of the comparison so that only the distance in the xy plane is considered. Comparing subsets of coordinates may allow for more efficient recall with respect to certain parameters where other parameters may be less relevant.

Returning to FIG. 3, in the illustrated example, the query vector 232 is as the circle with dotted lines. The query vector 232 has a position in the content space 226' based on the parameters of the query vector 232 that are mapped to coordinates in the content space 226'. A content vector 304 is determined to be a geometric distance D from the query vector 232 based on geometric mathematical operations performed to compare the position of the query vector 232 to the other content vectors in the content space 226'. In this example, the content vector 304 is the closest of any of the content vectors to the query vector 232, and thus is determined to be correlated to the query vector 232. In other examples, more than one content vector may be correlated to a query vector depending on the parameters of the query vector.

Returning to FIG. 2, the user-specific virtual conscience model 202 may be configured to output a response 234 to the query 230 that identifies a user-specific interaction corresponding to the identified content vector that correlates to the query vector 232. The response 234 may be presented to the first user via the virtual conscience chat bot 212. For example, the virtual conscience chat bot 212 may employ AQA NLP techniques to provide the response 234 as an answer to a question of the first user.

In some examples, the response 234 to the query 230 may include a content object that was generated by a computer application program 238 during the identified user-specific interaction. For example, the first user may ask the virtual conscience chat bot 212 about a specific phrase or subject that another user wrote in a comment of a word-processing document in which the two users had collaborated on in the past. In response to the query, the virtual conscience chat bot 212 may return the word-processing document itself. In other examples, the virtual conscience chat bot 212 may instead present the comment made by the other user along with a link to where the word-processing document is stored so that the first user may open the word-processing document if desired.

In some implementations, the virtual conscience chat bot 212 may be configured to predictively send queries to the user-specific virtual conscience model 202 in order to provide suggestions to the first user. Such predictive queries may be generated based on an observed current user-specific interaction and/or a current operating state of the computing system 200.

For example, the virtual conscience chat bot 212 may observe that the first user is conducting a video conference with another user while also sharing a slide-presentation document with the other user. The virtual conscience chat bot 212 may generate a query that includes parameters corresponding to the observed user-specific interaction. The user-specific virtual conscience model 202 may translate the query into a query vector and map the query vector to the high-dimensional content space 226. Further, the user-specific virtual conscience model 202 may perform one or more geometric mathematical operations to compare different content vectors in the high-dimensional content space to the query vector to identify a content vector that correlates to the query vector. The query may return one or more other content objects that have a correlation to the parameters of the observed user-specific interaction. As one example, the virtual conscience chat bot 212 may return other files stored in the same folder as the slide-presentation document that have been viewed by both of the users before. As another example, the virtual conscience chat bot 212 may return other files tagged with the same or similar contextual keywords as the slide-presentation document that have been viewed by both of the users before. As yet another example, the virtual conscience chat bot 212 may return other comments made by the other user in other content objects (previous meetings, emails, etc.) that are tagged with the same or similar contextual keywords as the slide-presentation document.

The virtual conscience chat bot 212 may generate any suitable predictive query for any suitable observed user-specific interaction and/or operating state of the computing system 200 in order to provide suggestions to the first user.

In some implementations, the user-specific virtual conscience model 202 may include a plurality of different high-dimensional content spaces 236 that may correspond to different personas of the first user. Each different persona of the first user may have different user-interaction constraints that may regulate the type of user-specific interactions that are mapped to the corresponding high-dimensional content space.

For example, the first user may have a family, a job, and the first user may also play guitar in a band. Thus, the first user may have a work persona, a family persona, and a band persona for which a different corresponding high-dimensional content space is maintained. The virtual conscience model 202 may receive user-specific application data from different computer application programs and translate the user-specific application data into a plurality of content vectors. For each content vector, the virtual conscience model 202 may be configured to associate the content vector with a specified persona based on the plurality of parameters of the content vector. In particular, the virtual conscience model 202 may include logic that is programed to analyze or classify incoming user-specific application data to determine which persona(s) is/are most related to the user-specific application data. The logic may be configured to associate content vectors with different personas using any suitable approach. In one non-limiting example, the logic may be configured to weight different factors for sorting of content vectors to different personas. For example, weighting may be based on factors including, but not limited to, a physical location of user when interaction occurs, who the interaction is with, what application program is used when the interaction occurs, what computer is used for the interaction (e.g., smartphone vs work desktop computer), what NLP derives that content of interaction is about, and how a user flags an interaction. In this way, different high-dimensional content spaces may be populated with different content vectors that are associated with the different personas of the first user. In some examples, a particular content vector may be associated with more than one persona and may be mapped to more than one high-dimensional content space.

Figure 4:
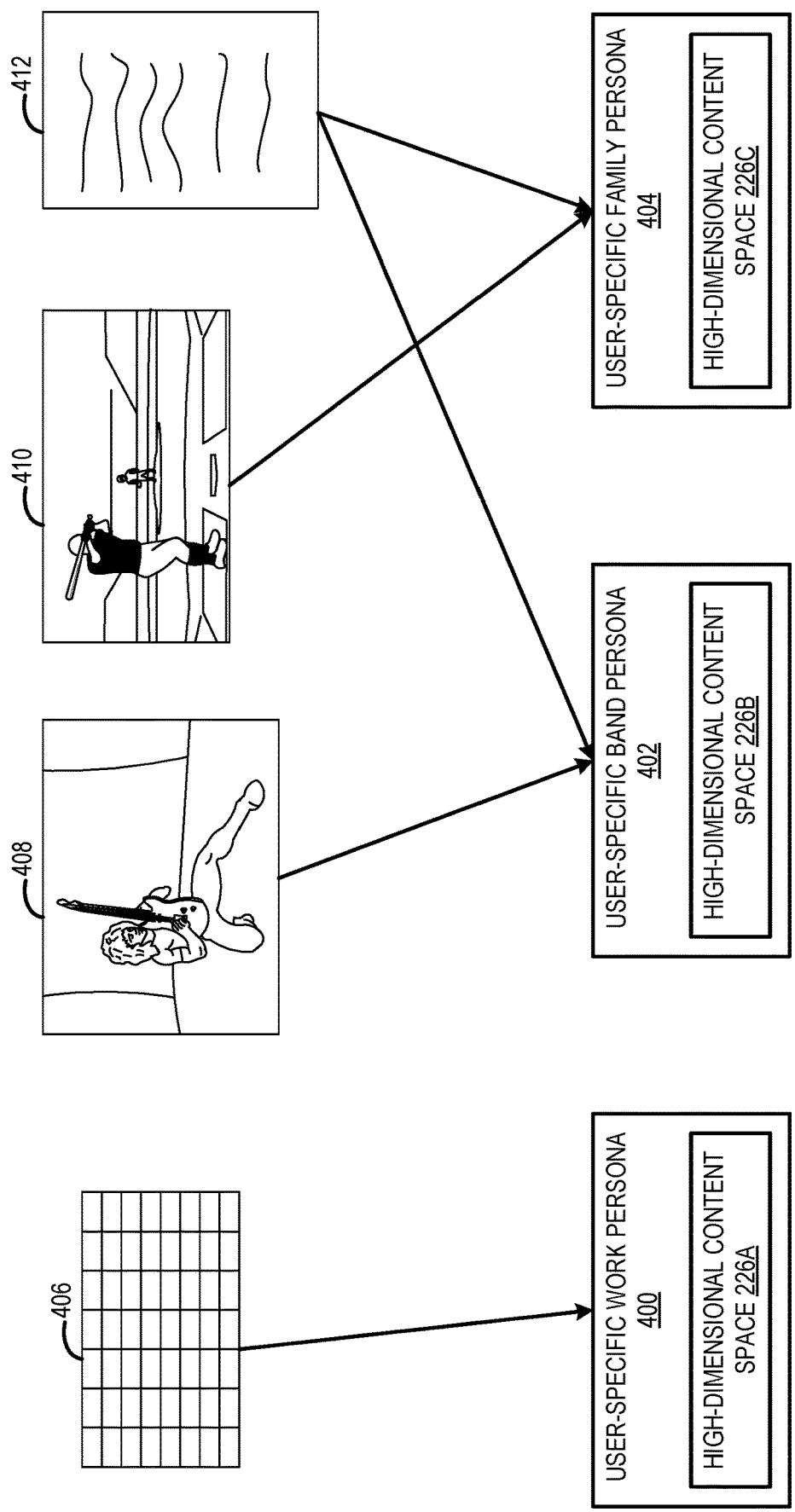
FIG. 4 shows an example scenario in which different content is associated with different personas of a user.

FIG. 4 shows an example scenario in which different content is associated with the different personas of the first user. The first user has a user-specific work persona 400, a band persona 402, and a family persona 404. A first high-dimensional content space 226A corresponds to the work persona 400. A second high-dimensional content space 226B corresponds to the band persona 402. A third high-dimensional content space 226C corresponds to the family persona 404.

The user-specific virtual conscience model 202 shown in FIG. 2 receives user-specific application data representing a spreadsheet 406 from a spreadsheet computer application program. The user-specific virtual conscience model 202 translates the user-specific application data into a content vector. The parameters of the content vector indicate that the first user and a coworker are collaborating on the spreadsheet 406. As such, the user-specific virtual conscience model 202 associates the spreadsheet 406 with the work persona 400 based on parameters of the content vector and maps the content vector to the first high-dimensional content space 226A.

Next, the user-specific virtual conscience model 202 receives user-specific application data representing a video 408 of the band performing a concert from a video editing computer application program. The user-specific virtual conscience model 202 translates the user-specific application data into a content vector. The parameters of the content vector indicate that the video 408 includes subject matter related to music and performance. As such, the user-specific virtual conscience model 202 associates the video 408 of the band with the band persona 402 based on parameters of the content vector and maps the content vector to the second high-dimensional content space 226B.

Next, the user-specific virtual conscience model 202 receives user-specific application data representing an image 410 of a child of the first user playing baseball from an image sharing computer application program. The user-specific virtual conscience model 202 translates the user-specific application data into a content vector. The parameters of the content vector indicate that the image 410 includes subject matter related to the first user's family. As such, the user-specific virtual conscience model 202 associates the image 410 with the family persona 404 based on parameters of the content vector and maps the content vector to the third high-dimensional content space 226C.

Next, the user-specific virtual conscience model 202 receives user-specific application data representing an email 412 from the first user's spouse. In the email, the first user's spouse inquires about the family joining the band on an upcoming concert tour. The user-specific virtual conscience model 202 translates the user-specific application data into a content vector. The parameters of the content vector indicate that the email 412 includes subject matter related to both the band persona 402 and the family persona 404. As such, the user-specific virtual conscience model 202 associates the email 412 with both the band persona 402 and the family persona 404 based on parameters of the content vector and maps the content vector to both the second high-dimensional content space 226B and the third high-dimensional content space 226C.

The above-described scenario illustrates how different high-dimensional content spaces may be populated with different types of content vectors that may be more closely related to each other than using just one high-dimensional content space populated with more diverse (unrelated) content vectors.

Returning to FIG. 2, in implementations where a user has a plurality of different personas, in some examples, the user-specific virtual conscience model 202 may be configured to associate a query to a specified persona of the plurality of different personas, such that the query is only applied to the high-dimensional content space corresponding to the specified persona. Accordingly, the query may produce a response that is likely to be in line with the user's expectations. In other examples, the query may be applied to each of the plurality of different high-dimensional content spaces to produce different results. For example, such a scenario may occur if the user-specific virtual conscience model 202 is unable to classify the query as being related to a particular persona.

The user-specific virtual conscience model 202 has been discussed in the context of a single user. The computing system 200 may be configured to execute a plurality of different user-specific virtual conscience models that are personalized for each different user based on the user-specific interactions of the user. Since each user-specific virtual conscience model is personalized for each different user, the same query made by different users may produce different responses based on the individual interactions of the different users.

In some implementations, when a user does not have any prior interactions that are observed by the user-specific virtual conscience model 202, the user-specific virtual conscience model 202 may group the user with other users having similar characteristics (e.g., coworkers, band members, family members). Such a feature may be activated only after the user and/or the other users in the group opt-in to the feature. In this way, user data is not shared without the user's permission. Further, the user-specific virtual conscience model 202 may use the prior interactions of the other users in the group in order to provide responses that are more likely to align with the user's expectations until the user's high-dimensional content space can be populated with content vectors corresponding to user-interactions of the user. Eventually, as the user's high-dimensional content space becomes populated, the user-specific virtual conscience model 202 may become more personalized according to the user-specific interactions of the user.

The user-specific virtual conscience model 202 may differ from other "chat bot" approaches, since the user-specific virtual conscience model 202 is not just a basic search engine that iterates over data trying to find a best match given a query. Instead, the user-specific virtual conscience model 202 has a deeper understanding of user-specific interactions and processes human-like answers that may include various interaction attributes without just quoting exact data or only returning specific content objects.

The computing system 200 may include one or more physical computing devices. In some examples, different computing devices may perform different functions of the computing system 200. For example, the functionality of the interaction tagger 216 may be performed by a first computing device or a first subset of computing devices, the functionality of the auto encoder neural network 228 may be performed by a second computing device or a second subset of computing devices, and the high-dimensional content space 226 may be hosted on a third computing device or a third subset of computing devices. The functionality of the computing system 200 may be distributed across a plurality of different computing devices in any suitable manner.

Figure 5:
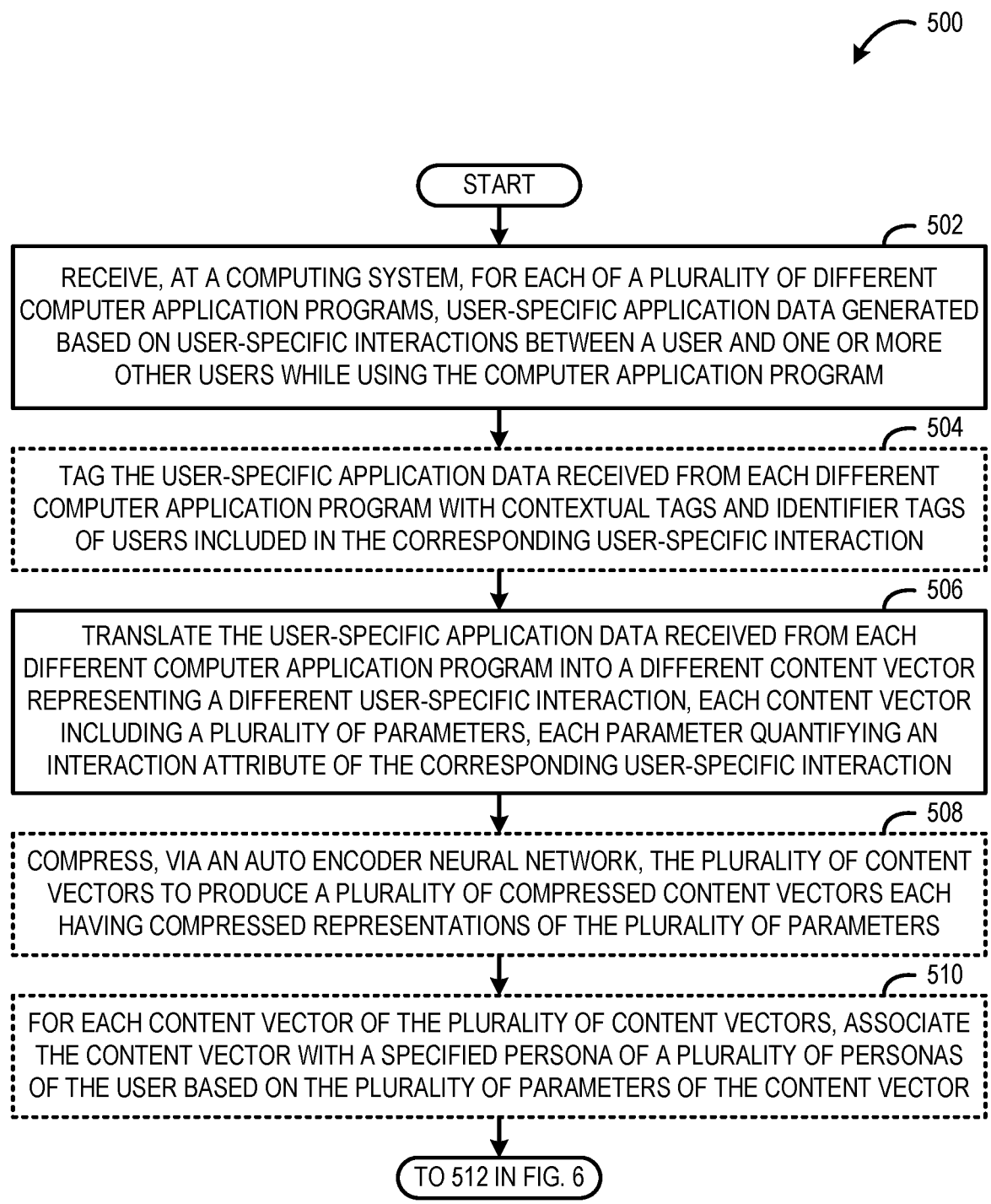
FIGS. 5 and 6 show an example computer-implemented method for recalling user-specific interactions.
Figure 6:
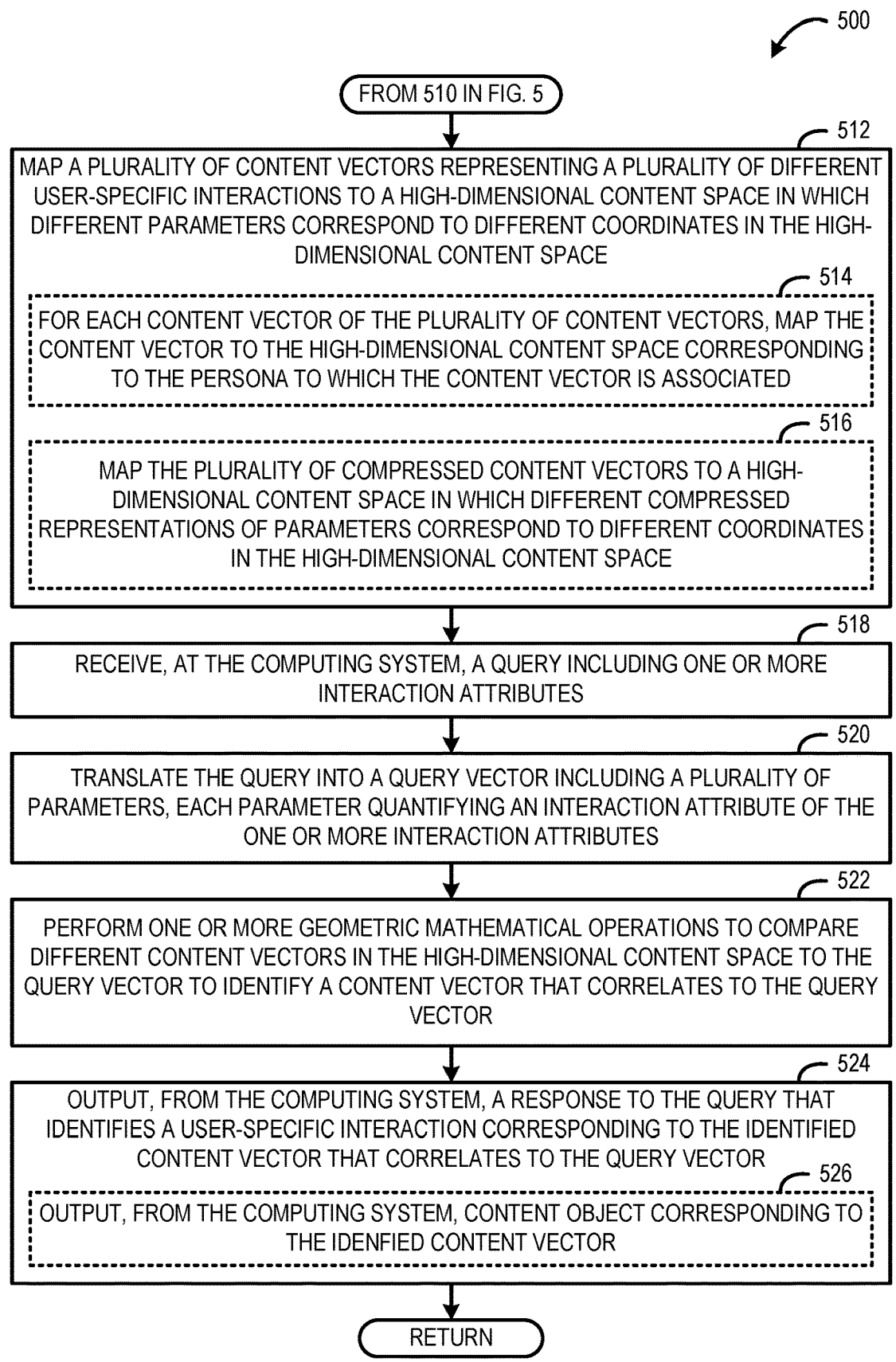

FIGS. 5 and 6 show an example computer-implemented method 500 for recalling user-specific interactions. For example, the computer-implemented method 500 may be performed by the computing system 200 shown in FIG. 2 and more generally by any computing system having suitable processing and storage resources. Note that method steps illustrated in dotted lines may be optional in some implementations.

In FIG. 5, at 502, the computer-implemented method 500 includes receiving, at a computing system, for each of a plurality of different computer application programs, user-specific application data generated based on user-specific interactions between a user and one or more other users while using the computer application program.

In some implementations, at 504, the computer-implemented method 500 optionally may include tagging the user-specific application data received from each different computer application program with contextual tags and identifier tags of users included in the corresponding user-specific interaction. In one example, the interaction tagger 216 shown in FIG. 2 may provide such tagging functionality.

At 506, the computer-implemented method 500 includes translating the user-specific application data received from each different computer application program into a different content vector representing a different user-specific interaction. Each content vector may include a plurality of parameters, and each parameter may quantify an interaction attribute of the corresponding user-specific interaction.

In some implementations, at 508, the computer-implemented method 500 optionally may include compressing, via an auto encoder neural network, the plurality of content vectors to produce a plurality of compressed content vectors each having compressed representations of the plurality of parameters. In one example, the auto encoder neural network 228 shown in FIG. 2 may provide such compression functionality.

In some implementations where a user has a plurality of different personas, at 510, the computer-implemented method 500 optionally may include for each content vector of the plurality of content vectors, associating the content vector with a specified persona of the plurality of personas of the user based on the plurality of parameters of the content vector. In one example, each content vector may be associated with one of the personas 400, 402, 404 shown in FIG. 4.

Moving to FIG. 6, at 512, the computer-implemented method 500 includes mapping a plurality of content vectors representing a plurality of different user-specific interactions to a high-dimensional content space in which different parameters correspond to different coordinates in the high-dimensional content space. In one example, the content vectors may be mapped to the high-dimensional content space 226 shown in FIG. 3.

In some implementations where the user has a plurality of different personas, at 514, the computer-implemented method 500 optionally may include for each content vector of the plurality of content vectors, mapping the content vector to the high-dimensional content space corresponding to the persona to which the content vector is associated.

In some implementations where the content vectors are compressed by the auto encoder-decode neural network, at 516, the computer-implemented method 500 optionally may include mapping the plurality of compressed content vectors to a high-dimensional content space in which different compressed representations of parameters correspond to different coordinates in the high-dimensional content space.

At 518, the computer-implemented method 500 includes receiving, at the computing system, a query including one or more interaction attributes.

At 520, the computer-implemented method 500 includes translating the query into a query vector including a plurality of parameters. Each parameter may quantify an interaction attribute of the one or more interaction attributes of the query.

At 522 the computer-implemented method 500 includes performing one or more geometric mathematical operations to compare different content vectors in the high-dimensional content space to the query vector to identify a content vector that correlates to the query vector.

At 524, the computer-implemented method 500 includes outputting, from the computing system, a response to the query that identifies a user-specific interaction corresponding to the identified content vector that correlates to the query vector.

In some implementations, at 526, the computer-implemented method 500 optionally may include outputting, from the computing system, a content object corresponding to the identified content vector that correlates to the query vector.

The above-described computer-implemented method may be performed repeatedly to respond to different user queries in order to recall information about different user-specific interactions involving all sorts of content.

In some implementations, the methods and processes described herein may be tied to a computing system of one or more computing devices. In particular, such methods and processes may be implemented as a computer-application program or service, an application-programming interface (API), a library, and/or other computer-program product.

Figure 7:
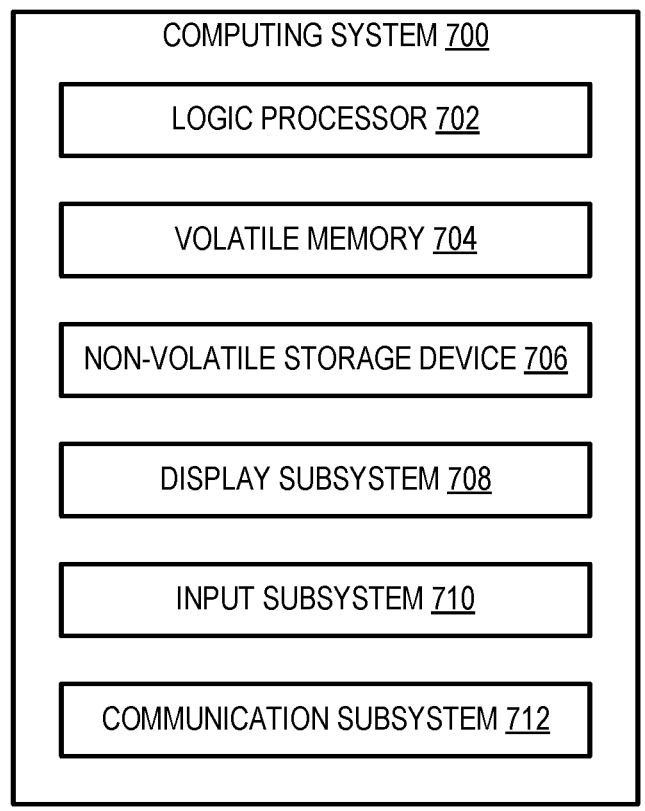
FIG. 7 shows an example computing system.

FIG. 7 schematically shows a non-limiting implementation of a computing system 700 that can enact one or more of the methods and processes described above. Computing system 700 is shown in simplified form. Computing system 700 may embody the computing system 200 including the network computer(s) 201 and the user computers 204 including the first user's computer 102 described above and illustrated in FIG. 2. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches, backpack host computers, and head-mounted augmented/mixed virtual reality devices.

Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 700 typically implemented by a processor to perform a particular function using portions of volatile memory, which function involves transformative processing that specially configures the processor to perform the function. Thus, a module may be instantiated via logic processor 702 executing instructions held by non-volatile storage device 706, using portions of volatile memory 704. It will be understood that different modules may be instantiated from the same application, service, code block, object, library, routine, API, function, pipeline, etc. Likewise, the same module, program, and/or engine may be instantiated by different applications, services, code blocks, objects, routines, APIs, functions, etc. The term "module" may encompass individual or groups of executable files, data files, libraries, drivers, scripts, database records, etc.

Any of the user-specific interaction analysis, including but not limited to the NLP analysis, the compression operations, and the high-dimensional content space analysis, described above may be implemented using any suitable combination of state-of-the-art and/or future machine learning (ML), artificial intelligence (AI), and/or other natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, microphone for speech and/or voice recognition, a camera (e.g., a webcam), or game controller.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 700 to send and/or receive messages to and/or from other devices via a network such as the Internet.

In an example, a computer-implemented method for recalling user-specific interactions comprises receiving, at a computing system, for each of a plurality of different computer application programs, user-specific application data generated based on user-specific interactions between a user and one or more other users while using the computer application program, translating the user-specific application data received from each different computer application program into a different content vector representing a different user-specific interaction, each content vector including a plurality of parameters, each parameter quantifying an interaction attribute of the corresponding user-specific interaction, mapping a plurality of content vectors representing a plurality of different user-specific interactions to a high-dimensional content space in which different parameters correspond to different coordinates in the high-dimensional content space, receiving, at the computing system, a query including one or more interaction attributes, translating the query into a query vector including a plurality of parameters, each parameter quantifying an interaction attribute of the one or more interaction attributes, performing one or more geometric mathematical operations to compare different content vectors in the high-dimensional content space to the query vector to identify a content vector that correlates to the query vector, and outputting, from the computing system, a response to the query that identifies a user-specific interaction corresponding to the identified content vector that correlates to the query vector. In this example and/or other examples, the response to the query may include a content object that was generated by a computer application program during the identified user-specific interaction corresponding to the identified content vector that correlates to the query vector. In this example and/or other examples, the content object may include at least one of a video conference recording, a voice recording, an email message, an instant message, a word-processing file, a slide-presentation file, a spreadsheet file, and an image. In this example and/or other examples, the query may include interaction attributes that characterize the specified user-specific interaction, the interaction attributes including one or more of key-words, key-phrases, topics, themes, a time when the specified user-specific interaction occurred, and other users involved in the specified user-specific interaction. In this example and/or other examples, the query may be generated responsive to user input to an automated question answering natural language processing computer application program. In this example and/or other examples, the high-dimensional content space may be one of a plurality of different high-dimensional content spaces corresponding to different personas of the user, and the computer-implemented method may further comprise for each content vector of the plurality of content vectors, associating the content vector with a specified persona of the plurality of personas of the user based on the plurality of parameters of the content vector, and mapping the content vector to the high-dimensional content space corresponding to the persona to which the content vector is associated, associating the query with a specified persona of the plurality of personas of the user based on the plurality of parameters of the query vector, and performing one or more geometric mathematical operations to compare different content vectors in the high-dimensional content space corresponding to the specified persona to the query vector to identify a content vector that correlates to the query vector. In this example and/or other examples, the user-specific application data received at the computing system may be an anonymized representation that does not include personal information of the user. In this example and/or other examples, the computer-implemented method may further comprise compressing, via an auto encoder neural network, the plurality of content vectors to produce a plurality of compressed content vectors each having compressed representations of the plurality of parameters, and the coordinates of the high-dimensional content space may correspond to the compressed representations of the plurality of parameters. In this example and/or other examples, the computer-implemented method may further comprise tagging the user-specific application data received from each different computer application program with contextual tags and identifier tags of users included in the corresponding user-specific interaction, and wherein interaction attributes of each content vector include contextual tags and identifier tags characterizing the corresponding user-specific interaction.

In another example, a computing system comprises a logic processor, and a storage device holding instructions executable by the logic processor to receive for each of a plurality of different computer application programs, user-specific application data generated based on user-specific interactions between a user and one or more other users while using the computer application program, translate the user-specific application data received from each different computer application program into a different content vector representing a different user-specific interaction, each content vector including a plurality of parameters, each parameter quantifying an interaction attribute of the corresponding user-specific interaction, map a plurality of content vectors representing a plurality of different user-specific interactions to a high-dimensional content space in which different parameters correspond to different coordinates in the high-dimensional content space, receive a query including one or more interaction attributes, translate the query into a query vector including a plurality of parameters, each parameter quantifying an interaction attribute of the one or more interaction attributes, perform one or more geometric mathematical operations to compare different content vectors in the high-dimensional content space to the query vector to identify a content vector that correlates to the query vector, and output a response to the query that identifies a user-specific interaction corresponding to the identified content vector that correlates to the query vector. In this example and/or other examples, the response to the query may include a content object that was generated by a computer application program during the identified user-specific interaction corresponding to the identified content vector that correlates to the query vector. In this example and/or other examples, the content object may include at least one of a video conference recording, a voice recording, an email message, an instant message, a word-processing file, a slide-presentation file, a spreadsheet file, and an image. In this example and/or other examples, the query may include interaction attributes that characterize the specified user-specific interaction, the interaction attributes including one or more of key-words, key-phrases, topics, themes, a time when the specified user-specific interaction occurred, and other users involved in the specified user-specific interaction. In this example and/or other examples, the query may be generated responsive to user input to an automated question answering natural language processing computer application program. In this example and/or other examples, the high-dimensional content space may be one of a plurality of different high-dimensional content spaces corresponding to different personas of the user, and the storage device may hold instructions executable by the logic processor to for each content vector of the plurality of content vectors, associate the content vector with a specified persona of the plurality of personas of the user based on the plurality of parameters of the content vector, and map the content vector to the high-dimensional content space corresponding to the persona to which the content vector is associated, associate the query with a specified persona of the plurality of personas of the user based on the plurality of parameters of the query vector, and perform one or more geometric mathematical operations to compare different content vectors in the high-dimensional content space corresponding to the specified persona to the query vector to identify a content vector that correlates to the query vector. In this example and/or other examples, the user-specific application data received at the computing system may be an anonymized representation that does not include personal information of the user. In this example and/or other examples, the storage device may hold instructions executable by the logic processor to compress, via an auto encoder neural network, the plurality of content vectors to produce a plurality of compressed content vectors each having compressed representations of the plurality of parameters, and the coordinates of the high-dimensional content space may correspond to the compressed representations of the plurality of parameters. In this example and/or other examples, the storage device may hold instructions executable by the logic processor to tag the user-specific application data received from each different computer application program with contextual tags and identifier tags of users included in the corresponding user-specific interaction, and interaction attributes of each content vector may include contextual tags and identifier tags characterizing the corresponding user-specific interaction.

In yet another example, a computer-implemented method comprises receiving, at a computing system, for each of a plurality of different computer application programs, user-specific application data generated based on user-specific interactions between a user and one or more other users while using the computer application program, translating the user-specific application data received from each different computer application program into a different content vector representing a different user-specific interaction, each content vector including a plurality of parameters, each parameter quantifying an interaction attribute of the corresponding user-specific interaction, for each content vector of the plurality of content vectors, associating the content vector with a specified persona of a plurality of different personas of the user based on the plurality of parameters of the content vector, and mapping the content vector to a high-dimensional content space corresponding to the persona to which the content vector is associated, receiving, at the computing system, a query including one or more interaction attributes, translating the query into a query vector including a plurality of parameters, each parameter quantifying an interaction attribute of the one or more interaction attributes, associating the query vector with a specified persona of a plurality of different personas of the user based on the plurality of parameters of the query vector, performing one or more geometric mathematical operations to compare different content vectors in the high-dimensional content space corresponding to the specified persona to the query vector to identify a content vector that correlates to the query vector, and outputting, from the computing system, a response to the query that identifies a user-specific interaction corresponding to the identified content vector that correlates to the query vector. In this example and/or other examples, the response to the query may include a content object that was generated by a computer application program during the identified user-specific interaction corresponding to the identified content vector that correlates to the query vector.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method for recalling user-specific interactions, the computer-implemented method comprising:
   receiving, at a computing system, for each of a plurality of different computer application programs, user-specific application data generated based on user-specific interactions between a user and one or more other users while using the computer application program;
   translating the user-specific application data received from each different computer application program into a different content vector representing a different user-specific interaction, each content vector including a plurality of parameters, each parameter quantifying an interaction attribute of the corresponding user-specific interaction;
   for each content vector of a plurality of content vectors translated from the user-specific application data,
      associating the content vector with a specified persona of a plurality of personas of the user based on the plurality of parameters of the content vector, wherein the plurality of personas of the user correspond to a plurality of different content spaces;
      mapping the content vector to a content space corresponding to the persona to which the content vector is associated;
   receiving, at the computing system, a query including one or more interaction attributes;
   translating the query into a query vector including a plurality of parameters, each parameter quantifying an interaction attribute of the one or more interaction attributes;
   associating the query with a specified persona of the plurality of personas of the user based on the plurality of parameters of the query vector;
   performing one or more geometric mathematical operations to compare different content vectors in the content space corresponding to the specified persona to the query vector to identify a content vector that correlates to the query vector; and
   outputting, from the computing system, a response to the query that identifies a user-specific interaction corresponding to the identified content vector that correlates to the query vector.

2. The computer-implemented method of claim 1, wherein the response to the query includes a content object that was generated by a computer application program during the identified user-specific interaction corresponding to the identified content vector that correlates to the query vector.

3. The computer-implemented method of claim 2, wherein the content object includes at least one of a video conference recording, a voice recording, an email message, an instant message, a word-processing file, a slide-presentation file, a spreadsheet file, and an image.

4. The computer-implemented method of claim 1, wherein the query includes interaction attributes that characterize the specified user-specific interaction, the interaction attributes including one or more of key-words, key-phrases, topics, themes, a time when the specified user-specific interaction occurred, and other users involved in the specified user-specific interaction.

5. The computer-implemented method of claim 1, wherein the query is generated responsive to user input to an automated question answering natural language processing computer application program.

6. The computer-implemented method of claim 1, wherein the user-specific application data received at the computing system is an anonymized representation that does not include personal information of the user.

7. The computer-implemented method of claim 1, further comprising:
   compressing, via an auto encoder neural network, the plurality of content vectors to produce a plurality of compressed content vectors each having compressed representations of the plurality of parameters; and
   wherein the coordinates of the content space correspond to the compressed representations of the plurality of parameters.

8. The computer-implemented method of claim 1, further comprising:
   tagging the user-specific application data received from each different computer application program with contextual tags and identifier tags of users included in the corresponding user-specific interaction, and wherein interaction attributes of each content vector include contextual tags and identifier tags characterizing the corresponding user-specific interaction.

9. A computing system comprising:
   a logic processor; and
   a storage device holding instructions executable by the logic processor to:
      receive for each of a plurality of different computer application programs, user-specific application data generated based on user-specific interactions between a user and one or more other users while using the computer application program;
      translate the user-specific application data received from each different computer application program into a different content vector representing a different user-specific interaction, each content vector including a plurality of parameters, each parameter quantifying an interaction attribute of the corresponding user-specific interaction;

for each content vector of a plurality of content vectors translated from the user-specific application data,
associate the content vector with a specified persona of a plurality of personas of the user based on the plurality of parameters of the content vector, wherein the plurality of personas of the user correspond to a plurality of different content spaces;
map the content vector to a content space corresponding to the persona to which the content vector is associated;

receive a query including one or more interaction attributes;

translate the query into a query vector including a plurality of parameters, each parameter quantifying an interaction attribute of the one or more interaction attributes;

associate the query with a specified persona of the plurality of personas of the user based on the plurality of parameters of the query vector;

perform one or more geometric mathematical operations to compare different content vectors in the content space corresponding to the specified persona to the query vector to identify a content vector that correlates to the query vector; and output a response to the query that identifies a user-specific interaction corresponding to the identified content vector that correlates to the query vector.

10. The computing system of claim 9, wherein the response to the query includes a content object that was generated by a computer application program during the identified user-specific interaction corresponding to the identified content vector that correlates to the query vector.

11. The computing system of claim 10, wherein the content object includes at least one of a video conference recording, a voice recording, an email message, an instant message, a word-processing file, a slide-presentation file, a spreadsheet file, and an image.

12. The computing system of claim 9, wherein the query includes interaction attributes that characterize the specified user-specific interaction, the interaction attributes including one or more of key-words, key-phrases, topics, themes, a time when the specified user-specific interaction occurred, and other users involved in the specified user-specific interaction.

13. The computing system of claim 9, wherein the query is generated responsive to user input to an automated question answering natural language processing computer application program.

14. The computing system of claim 9, wherein the user-specific application data received at the computing system is an anonymized representation that does not include personal information of the user.

15. The computing system of claim 9, wherein the storage device holds instructions executable by the logic processor to compress, via an auto encoder neural network, the plurality of content vectors to produce a plurality of compressed content vectors each having compressed representations of the plurality of parameters; and wherein the coordinates of the content space corresponding to the compressed representations of the plurality of parameters.

16. The computing system of claim 9, wherein the storage device holds instructions executable by the logic processor to tag the user-specific application data received from each different computer application program with contextual tags and identifier tags of users included in the corresponding user-specific interaction, and wherein interaction attributes of each content vector include contextual tags and identifier tags characterizing the corresponding user-specific interaction.

17. A computer-implemented method comprising:
receiving, at a computing system, for each of a plurality of different computer application programs, user-specific application data generated based on user-specific interactions between a user and one or more other users while using the computer application program;

translating the user-specific application data received from each different computer application program into a different content vector representing a different user-specific interaction, each content vector including a plurality of parameters, each parameter quantifying an interaction attribute of the corresponding user-specific interaction;

for each content vector of the plurality of content vectors,
associating the content vector with a specified persona of a plurality of different personas of the user based on the plurality of parameters of the content vector; and
mapping the content vector to a content space corresponding to the persona to which the content vector is associated;

receiving, at the computing system, a query including one or more interaction attributes;

translating the query into a query vector including a plurality of parameters, each parameter quantifying an interaction attribute of the one or more interaction attributes;

associating the query vector with a specified persona of a plurality of different personas of the user based on the plurality of parameters of the query vector;

performing one or more geometric mathematical operations to compare different content vectors in the content space corresponding to the specified persona to the query vector to identify a content vector that correlates to the query vector; and outputting, from the computing system, a response to the query that identifies a user-specific interaction and a content object that was generated by a corresponding computer application program during the identified user-specific interaction corresponding to the identified content vector that correlates to the query vector.

* * * * *